(No Model.)
H. J. CLIMER.
FOLDING STEP.
No. 504,966. Patented Sept. 12, 1893.
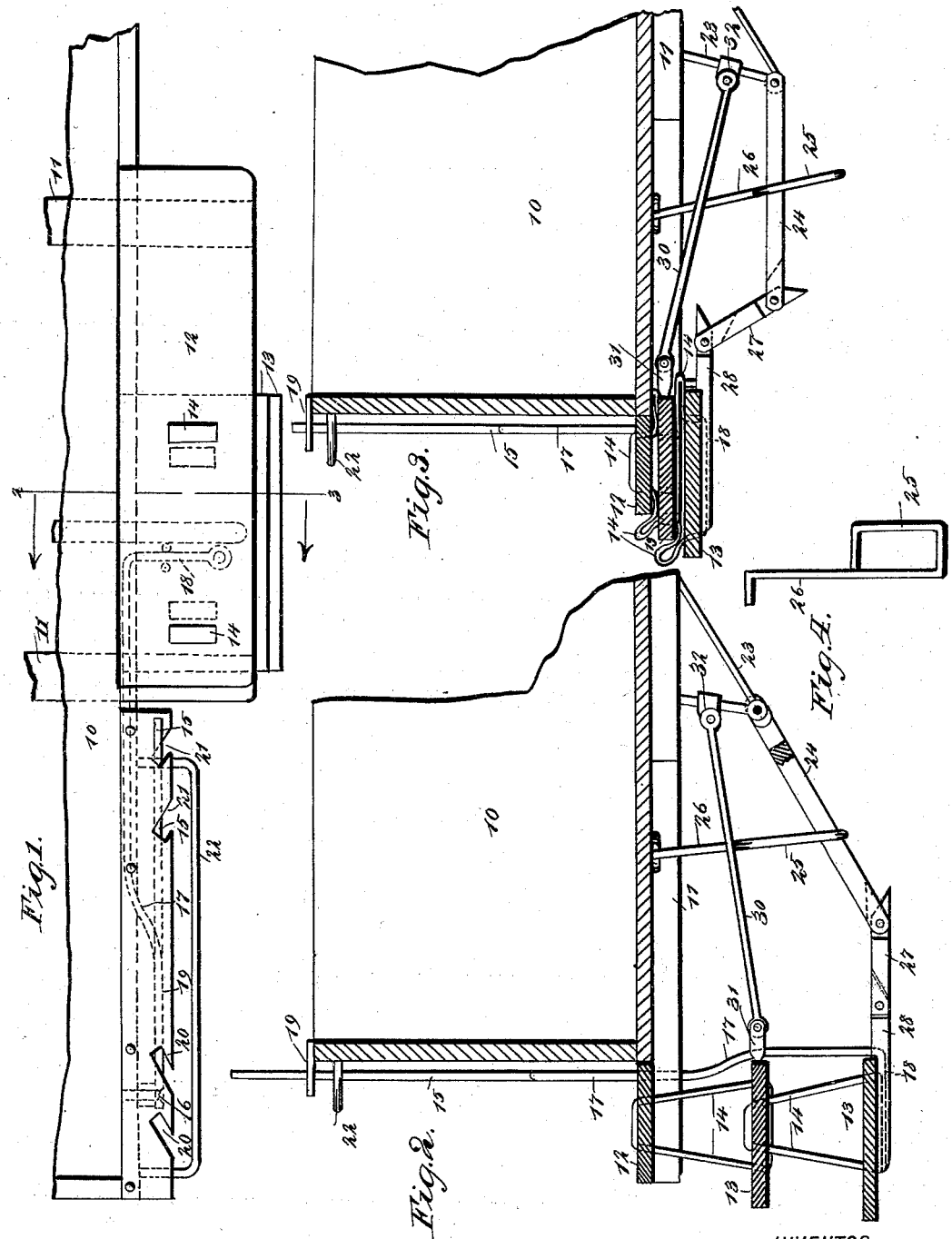
WITNESSES:
INVENTOR
ATTORNEYS.

UNITED STATES PATENT OFFICE.

HENRY J. CLIMER, OF ANNA, ILLINOIS.

FOLDING STEP.

SPECIFICATION forming part of Letters Patent No. 504,966, dated September 12, 1893.

Application filed April 29, 1893. Serial No. 472,370. (No model.)

*To all whom it may concern:*

Be it known that I, HENRY J. CLIMER, of Anna, in the county of Union and State of Illinois, have invented new and useful Improvements in Folding Steps, of which the following is a full, clear, and exact description.

My invention relates to improvements in steps which are adapted for attachment to vehicles of various kinds such as wagons, cars, and the like; and the object of my invention is to provide a simple flight of steps which may be cheaply and conveniently secured to any vehicle, which may be dropped so as to afford a convenient means of entering the vehicle, and which when not in use may be collapsed or folded so as to occupy but little space and be entirely out of the way of obstructions.

To these ends my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a broken plan view of a vehicle provided with my improved steps. Fig. 2 is a section on the line 2—3 in Fig. 1 and with the steps dropped into position for use. Fig. 3 is a view on the same line but with the steps folded; and Fig. 4 is a detail view of a guide and support which is used in connection with the steps.

The invention is shown as applied to an ordinary wagon body 10, the cross bars 11 of which project outward from the floor of the wagon body, and on the projecting ends of these cross bars is rigidly attached the upper step 12. Beneath this step are other steps 13, and any necessary number of them may be used. As shown in the drawings two of these movable steps 13 are employed, and this is usually a convenient number. The steps 13 are suspended by flexible hangers 14 which may be of leather, chains, rope, or other suitable material, and the upper one of the steps 13 is suspended from the one above in the same manner. The hangers are endless and extend through holes in the steps to which they are attached. The flexibility of the hangers enables the movable steps 13 to be raised so that the flight of steps may be folded up compactly, as in Fig. 3, and this is effected by a lever 15 which is fulcrumed, as shown at 16 on one side of the vehicle, and it has a downwardly and laterally extending arm 17 this having its lower end turned at a right angle, as shown at 18, and secured to the under side of the bottom step 13. The lever 15 extends upward above the top of the wagon body so that it may be conveniently grasped and operated and it moves opposite a toothed rack 19 which is secured to the top of the body 10 and which projects outward from its side, this rack having near the ends oppositely inclined slots 20 and 21 which are adapted to engage and hold the lever 15. A guide rail 22 extends parallel with the rack and the lever moves between this and the rack. When the lever is thrown to the right and made to engage one of the slots 21, it depresses the lower end of the arm 17, thus permitting the steps 13 to drop and extend the hangers 14, as illustrated in Fig. 2, but when the lever is thrown to the left and made to engage the slots 20, the lower end of the arm 17 is raised, thus lifting the steps 13 which close together, as in Fig. 3, the hangers 14 folding also as illustrated in the same figure.

On the under side of the vehicle is a bracket 23, at the lower end of which is pivoted a guide arm 24 which is held to move in the link 25 of the support 26, this being secured to the under side of the vehicle between the bracket 23 and the steps. The guide arm 24 is pivoted at its outer end to a link 27 and this link is also pivoted to a stud 28 on the lower step 13. The link 25 of the support 26 prevents the arm 24 from dropping too low, and the top of the link 25 serves as a support for a second guide arm 30 which is pivoted to a stud 31 on the second step 13 and to a coupling 32 on the bracket 23. These guide arms swing with the vertical movement of the steps and they hold the steps the correct distance from the side of the vehicle and also prevent the steps from swinging in and out.

It will be understood that while I have shown these steps applied to an ordinary wagon body, they may be applied to a vehicle of any kind whatever.

Having thus described my invention, I claim as new and desire to secure by Letters Patent—

1. The combination with a vehicle, of steps suspended by pliant hangers, and means for holding the steps projected and prevent them from swinging, substantially as described.

2. The combination, with a vehicle, of a flight of steps suspended from the vehicle, the steps being connected by flexible hangers, and a lever mechanism for raising the steps and folding them together, substantially as described.

3. The combination, with a vehicle, of a fixed step secured thereto, vertically movable steps suspended one beneath the other from the fixed step, flexible hangers connecting the several steps, and a lever fulcrumed on the vehicle and having one end extending beneath the lower step and adapted to swing upward, substantially as described.

4. The combination, with the vehicle, of a flight of steps suspended therefrom and connected together by flexible hangers, a lever for lifting the steps one against the other, and swinging guide arms pivoted beneath the vehicle and pivotally connected with the movable steps, substantially as described.

5. The combination, with the vertically movable steps connected together by flexible hangers, of the movable guide arms pivoted adjacent to the steps and pivotally connected with the steps, and a support and guide for the arms, substantially as described.

6. The combination, with the vehicle body, of the steps suspended by flexible hangers therefrom and arranged one above the other, a lever for lifting the steps, a bracket secured to the under side of the vehicle, a swinging guide arm pivoted to the bracket and pivotally connected to the lower step, a second guide arm pivoted to the bracket and to the next step above, and a depending support secured to the vehicle and having a link to receive the lower guide arm, substantially as described.

HENRY J. CLIMER.

Witnesses:
W. H. SIMPSON,
W. R. SIFFORD.